US005226148A

United States Patent [19]

Littlewood

[11] Patent Number: 5,226,148

[45] Date of Patent: Jul. 6, 1993

[54] METHOD AND APPARATUS FOR VALIDATING CHARACTER STRINGS

[75] Inventor: Timothy J. Littlewood, Nepean, Canada

[73] Assignee: Northern Telecom Limited, Montreal, Canada

[21] Appl. No.: 454,469

[22] Filed: Dec. 21, 1989

[51] Int. Cl.[5] .......... G06F 7/20

[52] U.S. Cl. .......... 395/575; 395/600; 371/57.1; 364/DIG. 1; 364/265.5; 364/285.4

[58] Field of Search .......... 395/275, 575, 600, 800; 364/419, DIG. 1, DIG. 2; 371/57.1

[56] References Cited

U.S. PATENT DOCUMENTS

| | | | |
|---|---|---|---|
| Re. 26,919 | 6/1970 | Hagelbarger et al. | 395/575 |
| 3,568,156 | 3/1971 | Thompson | 395/800 |
| 4,003,029 | 1/1977 | Niiho | 364/419 |
| 4,020,473 | 4/1977 | Fujimura | 395/275 |
| 4,255,796 | 3/1981 | Gabbe et al. | 395/600 |
| 4,383,307 | 5/1983 | Gibson, III | 395/575 |
| 4,438,505 | 3/1984 | Yanagiuchi et al. | 364/419 |
| 4,783,761 | 11/1988 | Gray et al. | 364/419 |
| 4,785,414 | 11/1988 | Hemdal | 395/575 |
| 4,916,655 | 4/1990 | Ohsone et al. | 395/600 |
| 4,991,135 | 2/1991 | Yoshimura et al. | 364/419 |

OTHER PUBLICATIONS

Knuth, The Art of Computer Programming, vol. 3, Sorting & Searching, 1973, pp. 416–417, 481–493.

*Primary Examiner*—David L. Clark
*Assistant Examiner*—John C. Loomis
*Attorney, Agent, or Firm*—Foley & Lardner

[57] ABSTRACT

In a method of, and apparatus for validating character sequences, for example strings of characters generated by keyboards or keypads in telephone systems, computers, and the like, increased speed and reduced memory requirements are achieved by comparing the characters with a database representing valid sequences of characters, the database comprising one or more segments each comprising valid character sequences. A potential range of characters is extrapolated from a character of the input character sequence taking into account possible values of possible succeeding characters. This potential range of sequences is than compared with a database segment. If there is intersection between the potential range and one of the valid character sequences, and there is no succeeding character in the input character sequence, the input character sequence is determined to be valid. If intersection exists and there is a succeeding character, a second potential range of sequences that is a subset of the first-mentioned potential range of sequences is extrapolated from the succeeding character. This second potential range of sequences is compared with the database to determine whether or not there is intersection between the second potential range of sequences and a the valid character sequence range. When the step of determining intersection has been performed for each character in the input sequence, the input character sequence is indicated to be complete.

26 Claims, 13 Drawing Sheets

START
802 SEQUENCE_LENGTH := 0
804 GET INPUT_CHARACTER
806 INPUT_SEQUENCE[SEQUENCE_LENGTH] :=INPUT_CHARACTER
808 SEQUENCE_LENGTH := SEQUENCE_LENGTH + 1
810 SEQUENCE_PARSER (PARSING_CONTEXT, SEQUENCE_LENGTH, INPUT_SEQUENCE, PARSING_RESULT, RESULT_PARAMETERS)
812 PARSING_RESULT := VALID
F
814 PARSING_RESULT := COMPLETE
T
816 GIVE ERROR RESPONSE
818 PERFORM APPLICATION SPECIFIC FUNCTION
820
EXIT

TARGET RANGE

| NAME | LENGTH | LIMITS | RANGE |
|---|---|---|---|
| A | 4 | 2563-6789 | A: 2563 – 6789 |
| B | 2 | 07-21 | B: 0700 – 2199 |
| C | 1 | 8 | C: 8000 – 8999 |

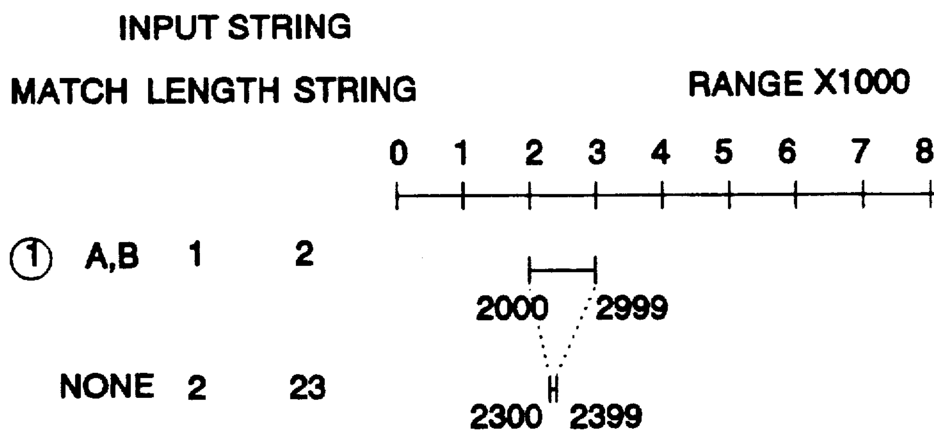
FIG 7A
② C*1 8
8000 9000
FIG 7B
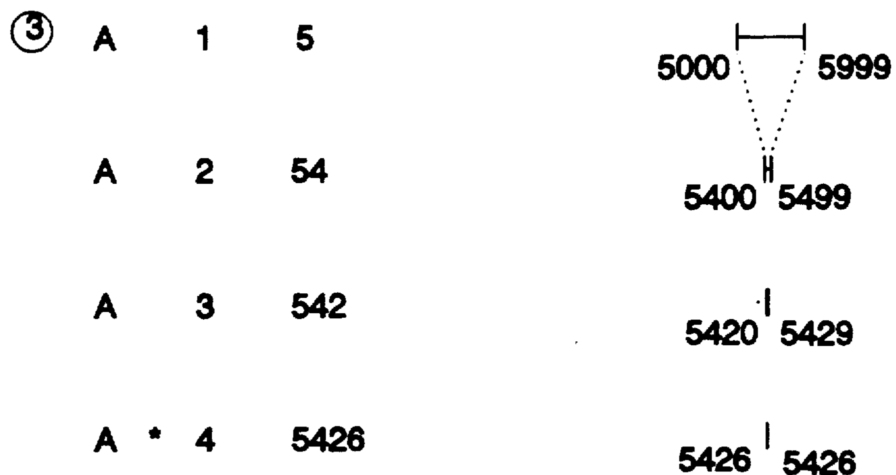
FIG 7C
* = COMPLETE

METHOD AND APPARATUS FOR VALIDATING CHARACTER STRINGS

FIELD OF THE INVENTION

The invention relates to validation of character sequences, and is applicable especially, but not exclusively, to the validation of strings of characters generated by keyboards or keypads such as are used for communicating with telephone systems, computers, and the like. Typical applications comprise password validation, telephone number dialling, and database access/-searching.

BACKGROUND

Typically such a system is programmed to recognise a predetermined set of "valid" character sequences, namely passwords, commands, directory addresses or other identifiers. These valid sequences are ∫sparse" subsets of the possible sequences that can be generated by the various possible permutations of the characters. A user may input invalid character sequences i.e. which the system does not understand. Hence, the system needs to determine whether or not each input character sequence corresponds to a valid sequence i.e. check that it is one that the system is programmed to recognise.

Optionally and error occurring early in the character string may be reported to the user before the entire character sequence or string has been entered, an obvious exception being password validation. Also, the validation process should be able to accommodate character strings of different lengths.

One form of character sequence validation used in existing systems is explicit matching, in which the entire input sequence (or string), or the part of it input so far, is compared with templates or a look-up table representing valid sequences. A disadvantage of this approach is that an individual template is required for every possible valid sequence and these templates must be searched, which is time consuming. Also, the table or list of templates occupies an inordinate amount of memory space.

Another known form of character sequence validation uses a three-type algorithm. In this system, a series of data records are interconnected by "pointers". Each record contains a valid character in the sequence, and a pointer. The pointer is an address which gives the location of the record corresponding to the next character in the sequence.

Sequences with common leading characters share a common tree nodes near the root of the tree. The tree branches where a succeeding character differs for two or more valid strings. This may be more space efficient than explicit matching, but a minimum of one tree node for each valid sequence is required and the pointers occupy valuable memory space since they must be stored in a record with the data. Also, the central processor has to access a pointer to find each valid character in the string, which takes a significant length of time.

OBJECT OF THE INVENTION

An object of the invention is to provide a character sequence validation arrangement particularly for use in communications or like systems in which the valid sequences form a smaller subset of all possible permutations of the characters available and which is more efficient in its use of memory and time than the aforementioned arrangements.

SUMMARY OF THE INVENTION

According to the present invention a method of validating a character sequence input to a data processing apparatus, said character sequence comprising characters occurring in an alphabet comprising an ordered list of such characters, said apparatus comprising a database comprising one or more pairs each of a first valid sequence and a final valid sequence representing, respectively, limits of a continuous range of alphabetically ordered valid sequences all having the same number of characters up to a predetermined maximum number of characters, the ranges being mutually disjoint, said method comprising the steps of:

in the event that said character sequence has fewer than said maximum number of characters, appending to said character sequence one or more of the first character of said alphabet to form a first potential character sequence having said predetermined maximum number of characters and appending to said character sequence one or more of the last character of said alphabet to form a final potential character sequence having said predetermined maximum number of characters, said first potential character sequence and said final potential character sequence representing respective limits of a continuous potential range of potential input character sequences defined by possible values of possible succeeding characters;

comparing said first potential character sequence and said final potential character sequence with said pairs and determining validation of said character sequence in dependence upon whether or not there is intersection between said continuous potential range of potential input character sequences and a said range of valid sequences; and in the event that said character sequences has said maximum number of characters, comparing said character sequence with respective first and final valid sequences of said pairs and determining validation of said character sequence in dependence upon whether or not said character sequence lies in a said range.

In this specification, the term "character" in the context of a character sequence is intended to embrace one or more symbols, alphanumerics, ASCII character code, hieroglyphics, icons, or other artifacts.

The input character sequence may be validated one character at a time, or the validation process may be carried out on all characters simultaneously, once all characters in the sequence have been entered by the user, or otherwise obtained.

Preferably, each segment comprises one or more sequences of the same number of characters grouped in alphabetical order within a range, said range being continuous i.e. all possible sequences between, and including, the bounds of the range are valid.

In this specification, the term "alphabetical order" is used to mean that the sequences are ordered from most to least significant character, and sequences differing only by a character of the same significance are ordered according to the character order in the alphabet. For example, where the alphabet comprised letters, the sequences ABZ and ACA would be adjacent. Where the alphabet comprised decimal digits 0 to 9, inclusive, sequences 128, 129, 130 and 131 would be adjacent members of a range.

In preferred embodiments of the invention, each sequence in a said database range has the same actual number of characters and each range is defined by a low limit and a high limit for said range, and a field comprising the actual number of characters in each sequence in that range. The step of determining said potential range of sequences then comprises extrapolating the input sequence to generate low and high limits for said potential range and said step of comparing said potential range comprises comparing said low and high limits of said potential range with said low and high limits, respectively, of said database range.

According to another aspect, the invention comprises processing apparatus comprising means for validating a character sequence input thereto said character sequence comprising characters occurring in an alphabet comprising an ordered list of such characters, said apparatus comprising a database representing valid sequences of said characters, said database comprising one or more pairs each of a first valid sequence and a final valid sequence representing, respectively, limits of a continuous range of alphabetically ordered valid sequences all having the same number of characters up to a predetermined maximum number of characters, said ranges being mutually disjoint, said apparatus including;

- means operable in dependence upon the number of characters in said character sequence being less than said predetermined maximum to append to said character sequence one or more of the first character of said alphabet to form a first potential character sequence having said predetermined maximum number of characters and to append to said character sequence one or more of the last character of said alphabet to form a final potential character sequence having said predetermined maximum number of characters, said first potential character sequence and said final potential character sequence representing respective limits of a continuous potential range of potential character sequences defined by possible values of possible succeeding characters;
- means for comparing said first potential character sequence and said final potential character sequence with said pairs and determining validation of said input character sequence in dependence upon whether or not there is intersection between said potential range of potential character sequences and a said range of valid sequences; and
- means operable in dependent upon said character sequence having said maximum number of characters to compare said character sequence with respective first and final valid sequences of said pairs and determine validation of said character sequence in dependence upon whether or not said character sequence lies in a said range.

BRIEF DESCRIPTION OF THE DRAWINGS

FIGS. 7A, 7B and 7C illustrate the character sequence validation process applied to sample character strings;

SPECIFIC DESCRIPTION OF A PREFERRED EMBODIMENT

Figure 1:
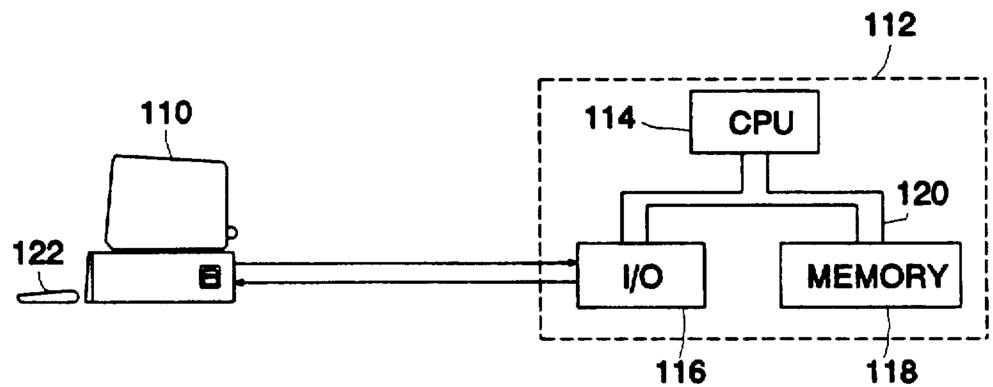
FIG. 1 is a block diagram of a computer or telecommunications system.

FIG. 1 shows a terminal 110 for communicating between a user and a computer or communications system 112 which comprises a central processing unit (CPU) 114, an input/output interface 116 and a memory 118, all interconnected by a parallel bus 120. In this particular case a user entering a character sequence via the keyboard 122 of terminal 110 will cause a sequence of digitally encoded characters to pass to the input/output interface 116. The computer or telecommunications system must determine whether or not this character sequence is valid, i.e. whether it is meaningful within the system.

The memory 118 contains a data base of valid character sequences and a set of machine instructions that performs the validation process. This data base would of course be "sparse" in the sense that it would contain only a limited set of the sequences that could be generated using all permutations of the characters available at the keyboard 122. The CPU 114 executes the machine instructions of the validation process, comparing the input sequence of characters with the valid character sequences stored in memory 118, and generates an output to the input/output interface 116 to indicate at the terminal 110 that the sequence is valid or not valid.

The memory 118 may also contain additional machine instructions that initiate a function associated with a particular, valid, input character sequence.

Figure 2:
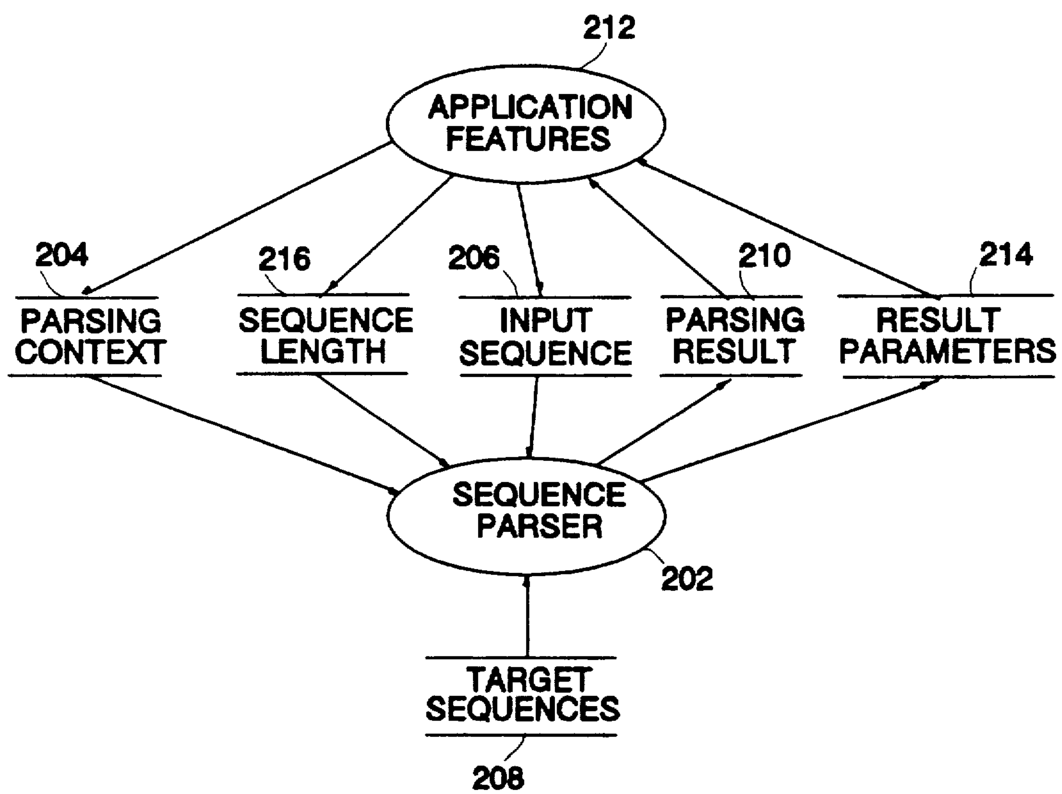
FIG. 2 is a data flow diagram for the system.

FIG. 2 is a data flow diagram corresponding to FIG. 1 and illustrates data flow in a telephone system such as that marketed under the trade mark NORSTAR by Northern Telecom Limited. In the Norstar type of system, application software packages of various instruction sets of perform different functions desired by the user, referred to as "features", may be activated directly by the user. For details of such a system, the reader is directed to copending U.S. patent application Ser. No. 07/291,949. entitled "Digital Key Telephone System" by T. Littlewood et.al., and U.S. patent application Ser. No. 07/317,396 entitled "DIGITAL KEY TELEPHONE SYSTEM" by Nadir Nizamuddin et al, both of which are incorporated herein by reference.

In a Norstar system there will be various contexts within which a particular character sequence that is generated by the user will need to be validated. Hence, particular sequences might be valid in one context, for example within a feature "line pool", i.e. a group of telephone lines which are used for outgoing lines and from which the user wishes to select one, whereas it might not be valid in another feature such as "call forwarding". Thus, as illustrated in FIG. 2, the sequence parser 202, i.e. the validation program being executed by CPU 114, receives a first command or data input "parser context" identifier as data 204. This parsing context data 204 will be determined by the application feature 212 for the particular circumstances within which the character sequence is being inputted by the user. For example, some prior event, such as the user operating a "function" key, might have activated a feature 212 that requires that the character sequence should be validated within the context of dialling a line pool. Hence the application feature 212 will specify a context to limit the subsequent parsing or validation process to a portion of the database which contains all of the potential or permissible line pool numbers.

When the input character sequence, identified as data item 206, is received, the sequence parser 202 will extract the various valid or "target" sequences, identified as data 208, from memory 118, perform the parsing or validation test, and then submit the parsing result 210 to the application feature 212. If the parsing result 210 indicates that a complete sequence has been validated, then result parameters 214, comprising application-specific data determined by that result, for example the line pool number, are returned to the application feature 212. The application feature 212 will then either report to the user, via the terminal 110, that the sequence was invalid, or initiate the function that is being required. Application feature 212 also records the current sequence length as data item 216, for reasons which will become apparent from the ensuing description.

Figure 3:
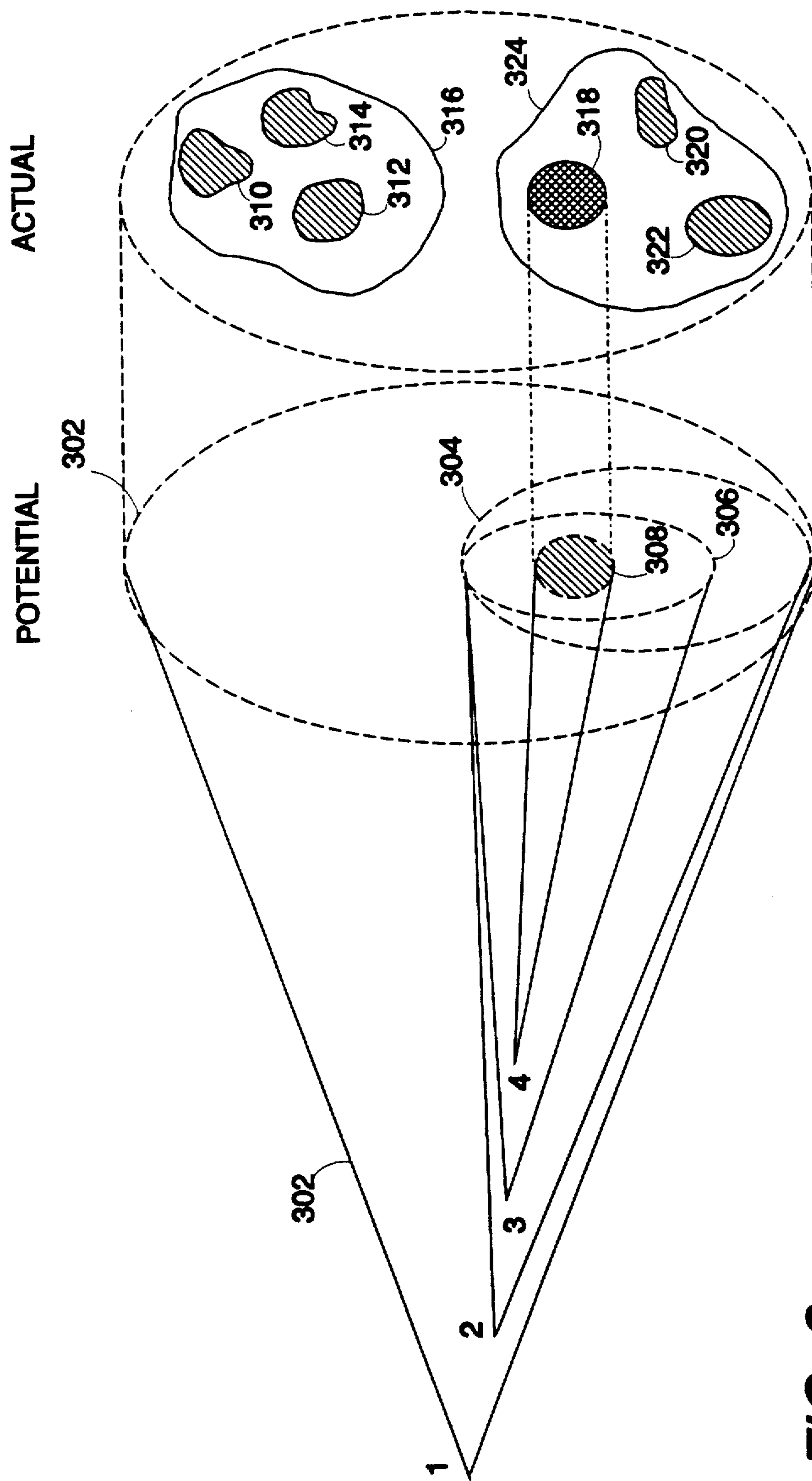
FIG. 3 is a schematic representation of a character validation process embodying the present invention.

FIG. 3 depicts the parsing or validation process and the way in which the input character sequence is, in essence, mapped onto the target segment.

For the purposes of this description, the ranges which are obtained by extrapolation from the characters in the input character sequence will be referred to as "potential" ranges whereas the ranges which actually exist in the database will be referred to as "actual" ranges.

FIG. 3 shows four nesting potential ranges 302, 304, 306 and 308. The user-generates first character (1), defines potential range 302 as the whole set of character sequences commencing with that character and which can be generated by various permutations of the succeeding characters in the input character sequence. Some of these character sequences will not be available in the data base, i.e. are "invalid". Others will be available and hence are "valid". These are grouped into "actual" ranges. In FIG. 3, actual ranges 310, 312 and 314, respectively, are grouped into segment 316 and actual ranges 318, 320 and 322, respectively, are grouped into segment 324. In each of the segments 316 and 324, the actual sequences are grouped into contiguous ranges. How these segments are involved in the concept of "context" will be described in more detail later.

The next character (2) in the input character sequence, "focuses" or limits the field of search to potential range 304, comprising those character sequences which commence with the first two characters (12). As will be seen from FIG. 3, this excludes the "actual" ranges 310, 312 and 314 in segment 316 and narrows the search to a major part of segment 324. Insofar as segment 324 comprises several ranges, the input sequence is still incomplete.

The third character (3) defines potential range 306 which limits the field yet further to exclude virtually the whole of ranges 320 and 322. The sequence (123) is still incomplete. The next character (4) of the input character sequence limits the field to potential range 308, which excludes actual ranges 320 and 322. Since character (4) is the final character in the input character sequence, potential range 308 corresponds to the target "actual" range 318. The input sequence (1234) is therefore complete and valid.

In a system such as Norstar (Trace Mark) the user may press a function key which will determine which particular application software is going to be invoked and this automatically will restrict the subsequent parsing or character validation process, via the parsing context input parameter 204, to a part of the memory database which is relevant to the particular application. For example, function key 1 might select a directory within the database of intercom numbers, i.e. for internal dialling, whereas function key 2 might select a directory of line pool numbers which can be accessed using an outside line. Although the subsequent numbers might well be common to both directories the parsing will only operate on one portion of that database. The parsing software of course need not even know that a function was selected; it will merely take the sequence of characters and validate it against the directory for that particular application.

Thus a particular sequence of characters might occur in both contexts i.e. as a line code and as an intercom number so they cannot be parsed simultaneously or the would provide an ambiguous result. Consequently the context must be parsed separately and hence the use of the function key to define the context within which the parsing is to take place.

Figure 4:
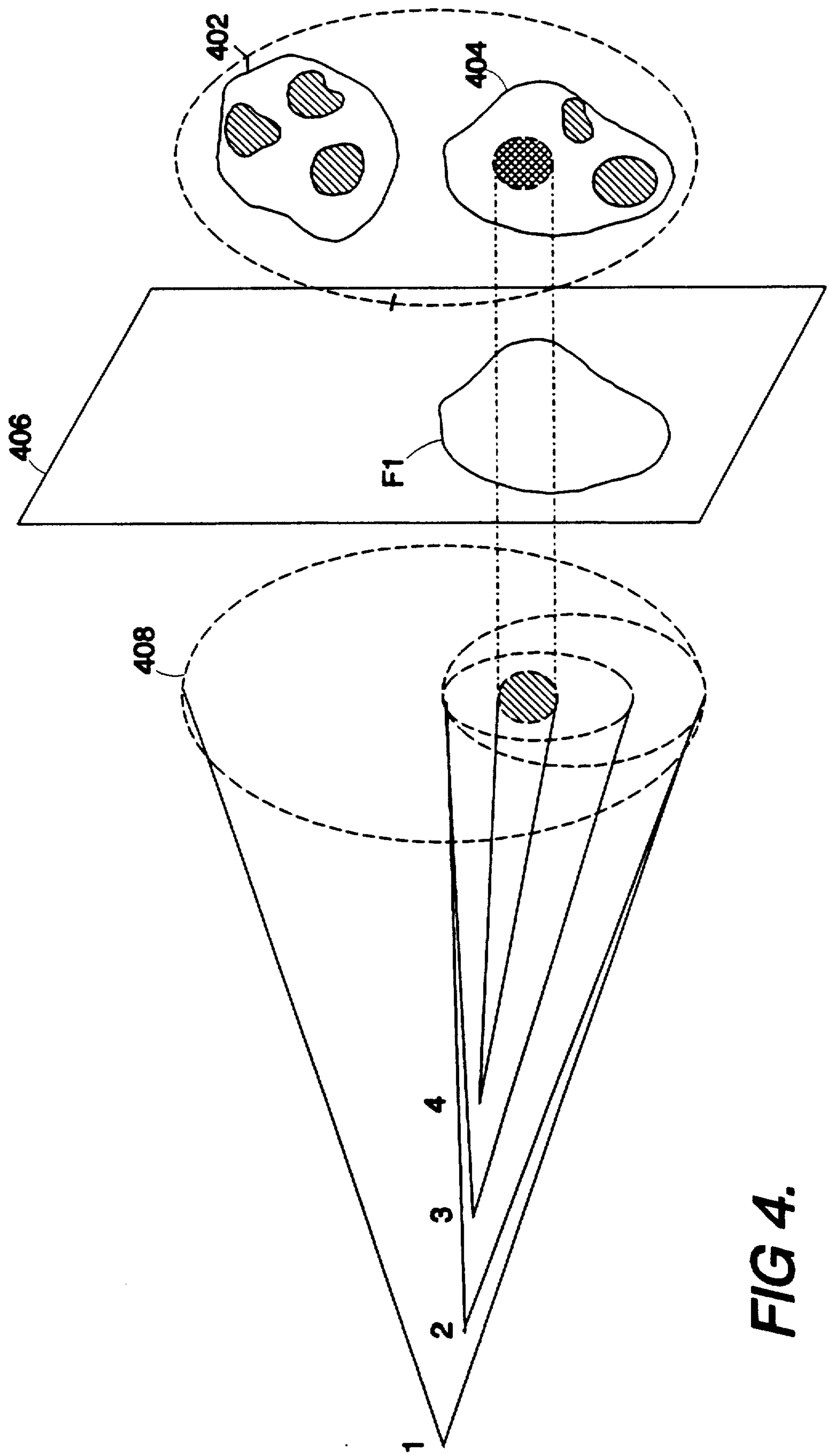
FIG. 4 corresponds to FIG. 3 but illustrates partitioning of the database by context.

FIG. 4 illustrates how different segments of valid ranges in the database can be segregated by virtue of the particular context in which the validation takes place. In FIG. 4, the segment 402 might represent a directory of intercom numbers and segment 404 might represent corresponding line pool numbers. The application software would be capable of differentiating between the two in dependence upon the context. Thus, if the user had selected the feature "line pool", the application software would recognise that the user must be wanting to place an outside call via a line pool that the user will then select. Accordingly, the validation of the subsequent character sequence would be limited to segment 404, as illustrated by the screen or mask 406 in FIG. 4.

In FIG. 4, operation of function key F1 which precedes the input of the character sequence 1234 corresponds to the user selecting the function line pool, which generates context mask 406. The mask 406 exposes segment 404 and excludes segment 402 and so allows access to segment 404. Alternatively, the context mask 406 may be implicitly determined by the system, rather than by selection of a function by the user.

Although the context mask 406 shows a single "window" for the context F1, it would be appreciated that F1 could comprise a plurality of "windows" each corresponding to a database segment.

Figure 5:
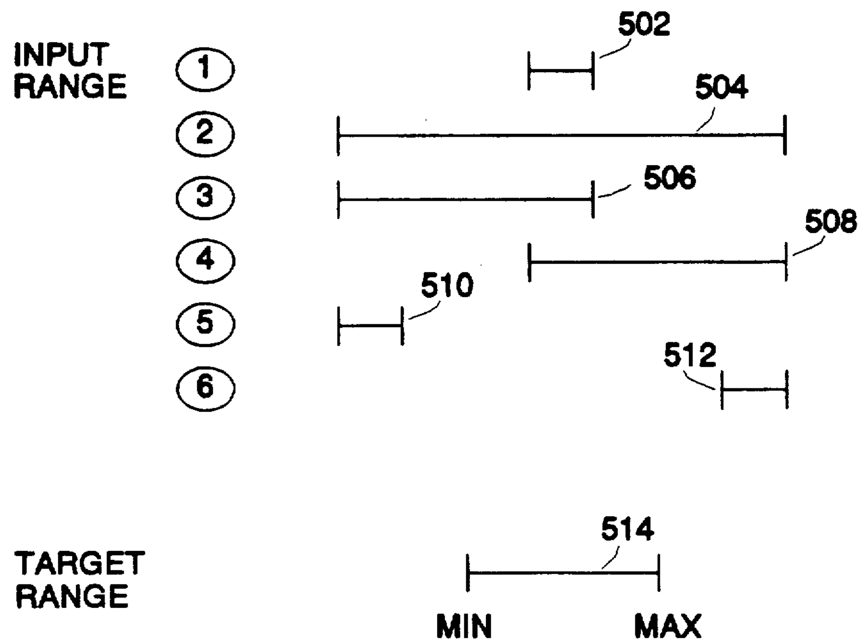
FIG. 5 illustrates input and target character sequence ranges.

FIG. 5 illustrates a series of potential ranges of character sequences 502, 504, 506, 508, 510, and 512 and a target or "actual" range 514. Range 502 is contained by the target range 514 and so is valid. Range 504 is also valid because it contains the target range. Likewise, range 506 is valid since it overlaps the low end of the target range 514, and range 508 is valid because it overlaps the high end of the target range 514.

Input ranges 510 and 512 are invalid because they lie entirely outside the lower and upper limits, respectively, of the target range 514.

Figure 6:
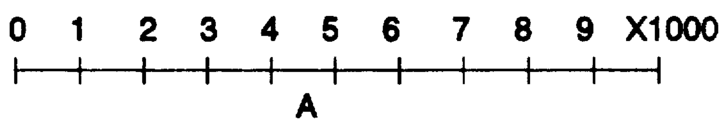
FIG. 6 illustrates target or valid ranges of character sequences in the database.

FIG. 6 illustrates three "actual" or target ranges of sequences A, B and C, i.e. which are in the databases. In this example, the alphabet consists of digits 0 to 9 inclusive only. Each range has a predetermined number of characters and lower and upper limits. Thus, target range A contains all sequences four characters long that fall between lower limit 2563 and upper limit 6789 inclusive. Target range B is two characters long and has lower and upper limits 0700 and 2199, respectively, and target range C is one character long and has lower and upper limits 8000 and 8999, respectively. Note that target strings less than the maximum length are extrapolated to maximum and minimum values at the upper and lower limits of their range [for example 8 extended to lower limit of 8000 and upper limit of 8999].

FIGS. 7A, 7B and 7C illustrate the validation process in comparing three typical character sequences 1, 2 and 3, respectively, with ranges of the target sequences illustrated in FIG. 6. In FIG. 7A, the sequence (1) comprises the number 23. The first digit, 2, is extrapolated into the potential range 2000 to 2999, a range which overlaps the high end of target sequence B and the low end of target sequence A in FIG. 6. With the second digit (3) however, potential range is narrowed to 2300 to 2399, thus excluding the remainder of the previous potential range. The new potential range 2300 to 2399 is above the high end of target range B (2199) and below the low end of target range A (2563). Hence, sequence (1) is invalid.

In FIG. 7B, character sequence or string 2 comprises the single digit (8), which is extrapolated into the potential range 8000 to 8999. This is coterminous with target range C in FIG. 6 and hence is valid and complete.

In FIG. 7C the sequence (3) is four digits long, specifically the digits 5426. The asterisk (*) next to the number 4 indicates that the sequence is complete at this point. The first digit (5) limits the potential range to 5000–5999, which is clearly within actual or target range A (FIG. 6). The next digit (4) limits the potential range to 5400 to 5499, which is still clearly valid; the next digit (2) further narrows the range to 420–5429, and finally the last digit, (6), limits the potential range to 5426 to 5426, which is contained in the target range A. Hence the input character string or sequence is determined to be valid and complete.

Figure 8:
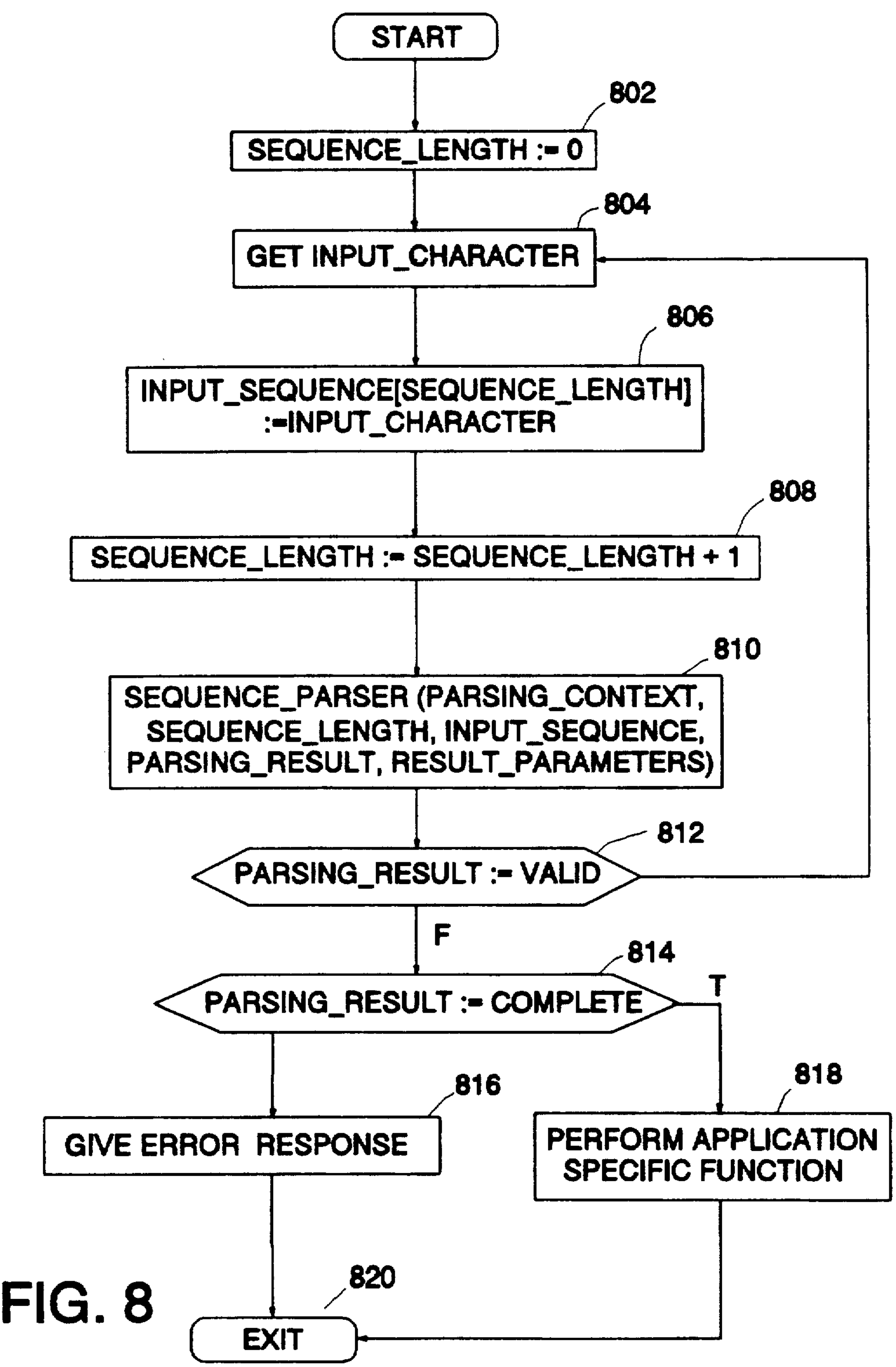
FIG. 8 is a general flowchart for the application feature and its relationship to the sequence parser.

Referring now to FIGS. 8 to 15, which are flowcharts depicting the validation process, FIG. 8 illustrates the application feature 212 of FIG. 2 and specifically how the application feature 212 invokes the sequence parser 202 and buffers the character sequence that it uses. The application feature collects the digits entered by the user, passes the sequence that it has collected into the sequence parser 202, gets a result back from the sequence parser 202 and, once the complete result is obtainable, performs application specific functions, as indicated by process step 818 of FIG. 8.

Referring then to FIG. 8, initially the application feature 212 has collected no characters, so it sets the "sequence length" variable to zero in step 802. Process step 804 collects a character which, in process step 806 is appended to the sequence in a digit buffer variable named "input sequence" where all the characters are buffered as they are collected. The "sequence length" variable is then incremented in process step 808. The sequence parser 202 (FIG. 2) is then invoked by process step 810. The context referred to in process step 810 will have been determined by the user directly before the character sequenced was entered, or will be implied by the environment in which the validation is taking place. (See FIG. 2, data 204). Once the sequence parser 202 has completed its validation procedure, as will be described in more detail later, it returns the parsing result 210. This result is tested as indicated by decision step 812 of FIG. 8. If the parsing result is valid, i.e. the digit was acceptable, but the input character sequence does not yet fully match a target sequence, the program returns to process step 804 and another character is processed. Conversely, if the result is not valid, decision step 814 then checks whether or not it was complete. If so, the appropriate function is initiated by process step 818, as previously mentioned. If the result was not complete, the only other possibility is that it was invalid, in which case process step 816 generates an error response.

In both cases, whether from process step 816 or 818, the program exits by way of step 820.

In the flowcharts and associated description, the general structure of the database will be implied and hence susceptible of implementation by one skilled in the art. Before the flowcharts depicting the operation of the sequence parser 202 are described, however, some specific declarations should be considered. The listed declarations correspond to the database of target sequences 208. These declarations will be given in Pascal source code but of course could be in any other language to suit the particular application. Three basic types of declarations are involved, namely constants, types and variables, rendered as CONST, TYPE and VAR, respectively. They are as follows:

```
CONST
{ Parser array bounds }
max_segment = 16;
max_entry = 256;
TYPE
  range_rec = PACKED RECORD
    range_start: INTEGER; {Treat as BCD digits}
    range_finish: INTEGER; {Treat as BCD digits}
    dig_count: INTEGER;
    result_param: INTEGER;
  END; {range_rec}
  contx_rec = PACKED RECORD
    CASE BOOLEAN OF
      TRUE: (bit: PACKED ARRAY [0..15] OF BOOLEAN);
      FALSE: (number:INTEGER);
  END; {contx_rec}
  header_rec = PACKED RECORD
    disjnt_segments: contx_rec;
    table_start: 0..max_entry - 1;
    table_finish: 0..max_entry - 1;
  END; {header_rec}
  parser_rec = PACKED RECORD
    last_segment: byte;
    last_entry: byte;
    header: PACKED ARRAY [0..Max-segment - 1]
    OF header_rec;
    table: PACKED ARRAY [0..Max-Entry - 1] OF range_rec;
  END; {parser_rec}
VAR
  parser_data: parser_rec;
```

The constants are used to define the size of the database and so are flexible or implementation dependent depending the size of the database. The types are records which are composed of fields. The word RECORD indicates a compound variable built up of these simple fields. The overall database structure is described by the record called "parser_rec" which is made up of header records and range records which are the two preceding record declarations. VAR is the statement which actually allocates the memory space for the data.

The record "contx_rec" is used to describe the context field in the database and is also used as an input parameter to the sequence parser when specifying context.

The context record is used in two ways. In the case of data item 204 of FIG. 2, it is used to specify the segments to be included in the validation or parsing process. The second case is in the header record where the context record is used to describe the disjoint segments for any given segment i.e. the segments for which the ranges must not overlap.

Figure 9:
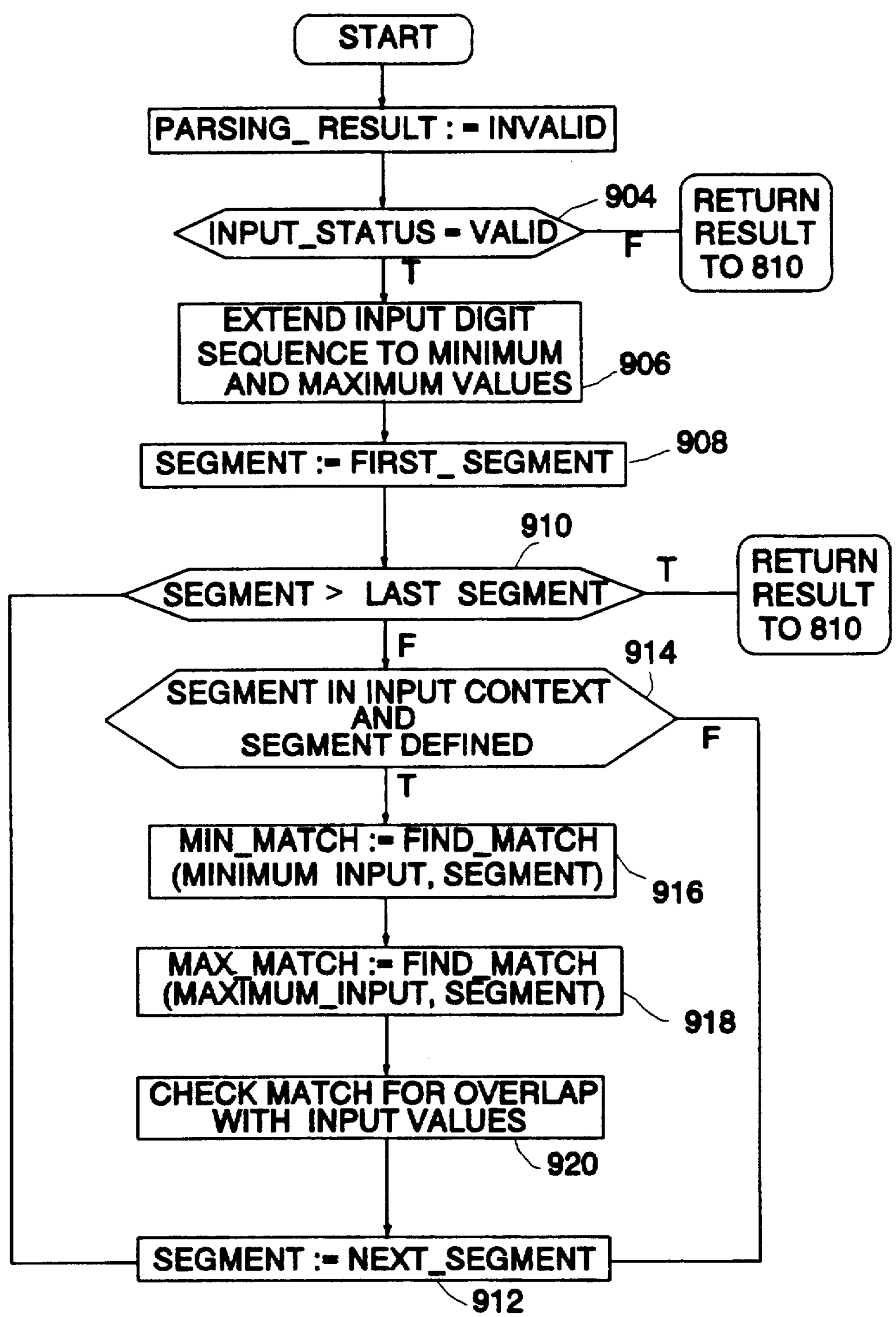
FIG. 9 is a flowchart for the sequence parser.
Figure 10:
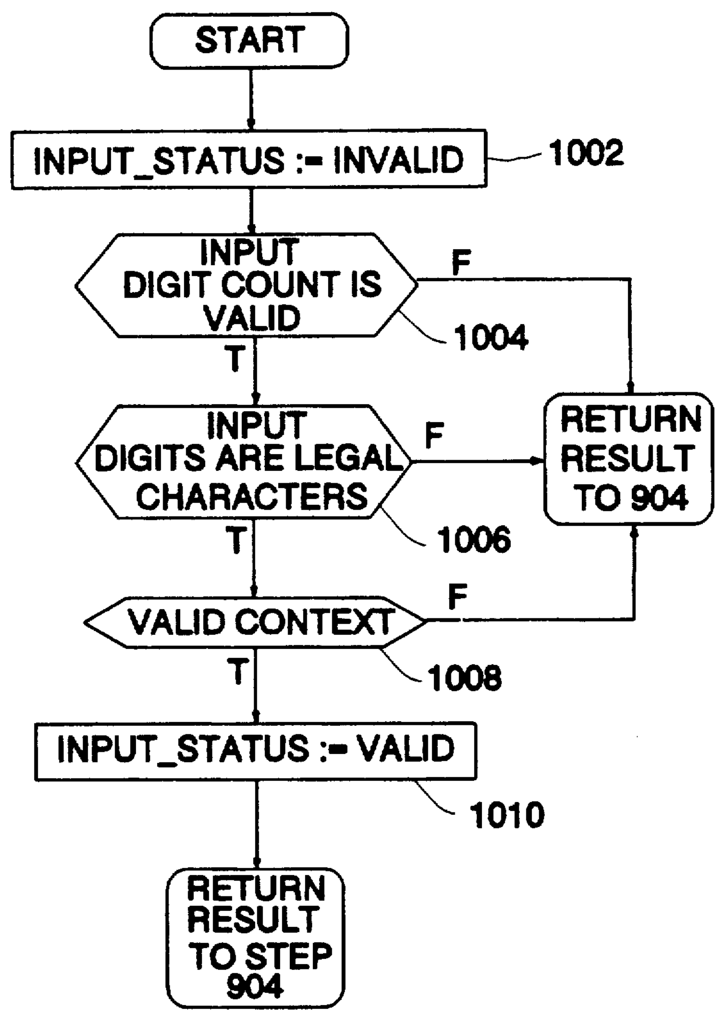
FIGS. 10, 11, 12, 13, 14 and 15 are more detailed flowcharts of specific steps in the flowchart of FIG. 9.

FIG. 9, details process step 810 describing the operation of the sequence parser 202 of FIG. 2. Initially process step 902 sets the variable "Parsing_result :=invalid" until determined otherwise. In process step 904 the input character sequences are checked to ensure that they are "legal", and the context is checked to ensure that valid segments of the database are being used. (FIG. 10 illustrates step 904 in more detail). "Extend input digit string . . . " process step 906 generates the potential range the sequence may attain as determined by the input character sequence.

The validation process will be carried out for each segment of the database and process step 908 initializes a variable "segment". Process step 910 determines whether or not the segment being searched is the last segment. If it is, the program returns the result to step 810 of the application feature. If it is not, decision step 914 determines whether or not the segment is in the input context and whether or not the segment has been defined. If not, the program goes to the next segment as in process step 912. If the segment is both in the input context and defined, process step 916 attempts to find a matching range in the database for the minimum limit of the input segment potential range and process step 918 determines a match for the maximum limit of the input character segment range. Process step 920 determines whether or not there is overlap between the potential range and the actual range. Process steps 912 to 920 inclusive are repeated for each segment until the last segment in the database has been completed whereupon process step 910 causes the program to exit.

Referring now to FIG. 10, which shows process step 940 in more detail, process step 1002 sets an internal "input_status" variable as "invalid". This implies that the input status is invalid until proved otherwise by the validation process. This entails three further steps. Decision step 1004 checks that the number of digits in the input character sequence is within the length of the actual sequences that are contained in the database. Decision step 1006 checks that all the digits int he string are legal, i.e. are contained in the alphabet that is being used. Decision step 1008 checks that the context requested in the input is valid, i.e. the segments exist in the database and the segments are disjoint. Hence if more than one segment is requested their ranges do not overlap. If any of decision steps 1004, 1006 and 1008 fails, the program exits. If all are true, however, process step 1110 sets the input_status variable to "valid".

Figure 11:
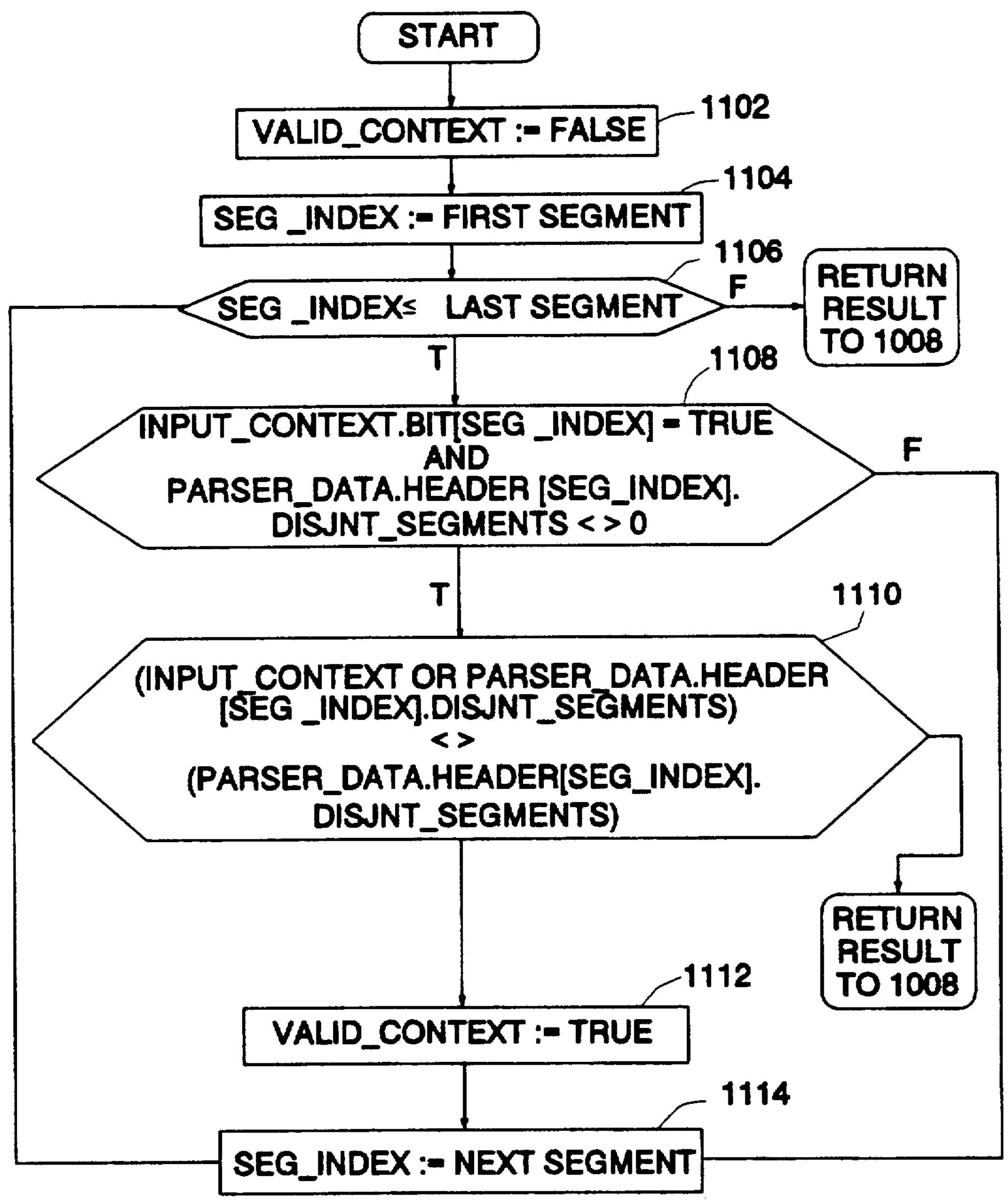

FIG. 11 shows process step 1008 in more detail, specifically validation of the input context against the actual segments in the database. Basically the context is described as a list of segments. Process step 1102 sets an initial variable to indicate that the input context is false until proven otherwise by the validation process. Process step 1104 and decision step 1106 cause the program to repeat for each segment in the database as in FIG. 8, steps 806, 808. Process step 1104 initialises the "first_segment" variable and each decision step 1106 then does a comparison to detect the last segment. If the last segment has been passed, the program exits to the main program. If the last segment has not been passed, decision step 1108 checks that the bit (as defined previously in the Pascal record "contx_rec" for the current segment is true i.e. indicating that the segment is part of the requested context. Also, decision step 1108 confirms that the disjoint segments for this segment in the databases are not zero, indicating that the segment is defined in the database. If both these conditions are true, decision step 1110 checks that the input context is disjoint with the database disjoint segments. In other words, there is no overlap.

In the database, there is a list of disjoint segments for each segment. For each segment, process step 1110 accesses the list of disjoint segments and confirms, essentially, that the requested segments in the input context do not contain anything in addition to those disjoint segments. Accordingly, this operation orders together the input context with the disjoint segments for that current segment. If any additional segments are specified in the input, there is potential for the segments in the input context to overlap with each other which would be illegal, since an ambiguous parsing result could occur, if the input sequence were valid in two more of the overlapping segments. This condition causes the program to exit from FIG. 11. Otherwise, if the condition in decision step 1110 is true, the context is valid and the validation process continues with process step 1112 which sets the context variable as "true". Steps 1108, 1110 and 1112 are repeated for each segment as controlled by process step 1114.

There is a minimum condition that at least one segment must be valid, though there is potential for more than one to be valid.

Figure 12:
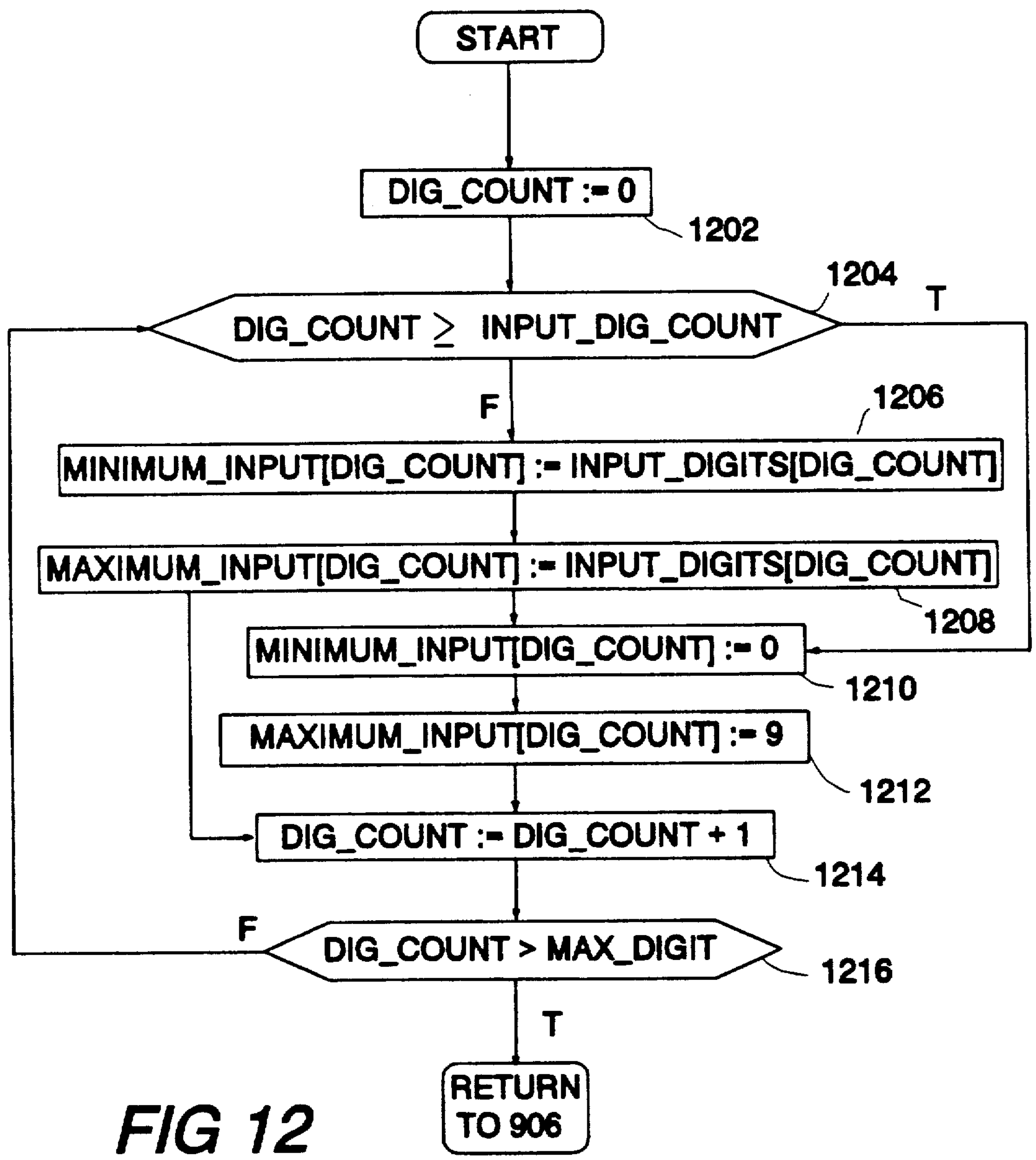

FIG. 12 shows in more detail process step 906 which extrapolates the digit string to generate two strings, one with a maximum value and the other with a minimum value. If the length of the input string is less than that of the maximum length of sequences in the database, additional characters are added to bring it up to the maximum length. The resulting string contains two parts; one part comprises the input digits and the other is the part which is extrapolated to the maximum or minimum value. In process step 1202, the internal variables are initialized to the first value of the digit count. Decision step 1204 compares the contents of a digit counter with a counter specifying the number of digits in the input sequence. When the value of the counter has reached the input string length, no more inputs digits remain to be copied.

If decision step 1204 indicates (F) that the end has not been reached, process steps 1206 and 1208 copy the input digits directly into the minimum and maximum value strings, respectively. If decision step 1204 determines that the end of the input sequence has been reached, process step 1210 appends the minimum character, which in this case is 0, to the string, and process step 1212 appends the maximum character, in this case 9, to the string. These values, 0 and 9, are defined as the first and last characters, respectively, in the alphabet, i.e. of characters defined in the database.

In either case, whether the string has been copied or extended, the next process step, 1214, increments the digit count to continue to the next digit in the sequence. Process step 1216 determines whether or not the number of digits processed is equal to the maximum number of digits. If it is not, the loop causes steps 1204 and 1214 to be repeated. In effect then, the input digits are copied into the maximum and minimum value strings and then the maximum/minimum strings extended until the maximum length of the string is reached. In this way, the potential range for the succeeding characters in the sequence is generated for each character. When step 1216 determines that the digit count is equal to the maximum, the program exits to step 908 of FIG. 9. Process step 912, checks whether or not the segment is defined and in the input context, as in step 1108 in FIG. 11. Process step 916 then determines whether or not a match exists between the minimum bond of the potential range generated for the input character and the actual database segment. Process step 918 determines whether or not a match exists between the maximum bound of the potential range and an actual range. If a match is found, process step 918 determines whether or not there is overlap.

Figure 13:
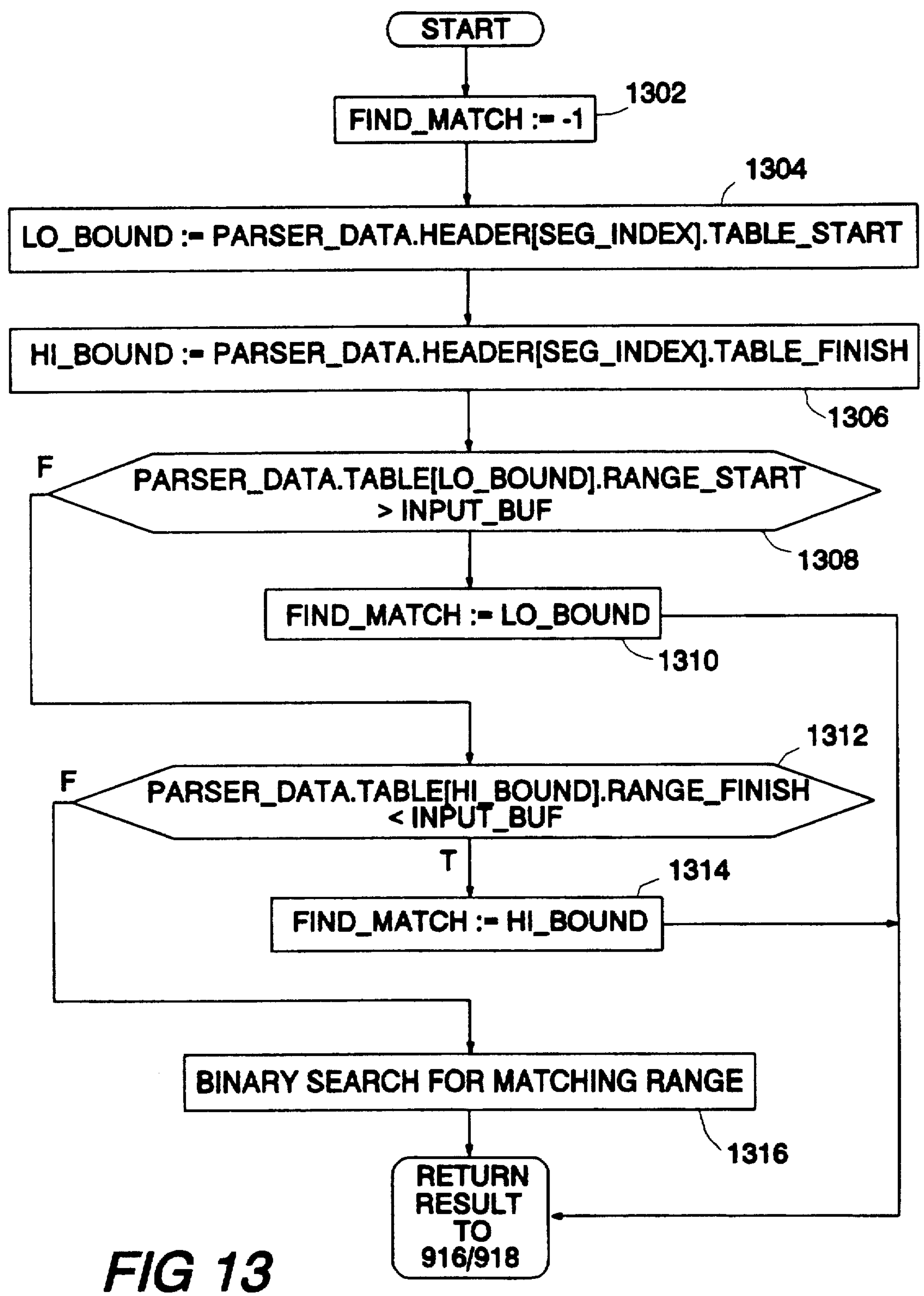

FIG. 13 shows in more detail the process steps 916 and 918 of FIG. 9, which finds a match for any input string entered into the database. It requires that the database be ordered so that the ranges within a segment are in order of increasing value. Initial process step 1302 initializes the "Find match" variable. It is assumed that there is a continuous range of indices into the database between the minimum and maximum bounds. Process steps 1304 and 1306 then determine the low and high bounds, respectively, of indices or ranges contained in that segment. Decision step 1308 determines whether the low bound of the lowest range in the segment is higher than the input value. If that is the case, the input sequence is completely disjoint, i.e. its input value is completely outside the actual segment so there can be no overlap. Consequently, process step 1310 registers a low bound value. Decision step 1312 compares with the high bound of the highest range in the segment. If the high end of the highest range of the segment is below the input buffer value, i.e. the potential range, again there is no overlap so process step 1314 registers a value for the high bound.

Figure 14:
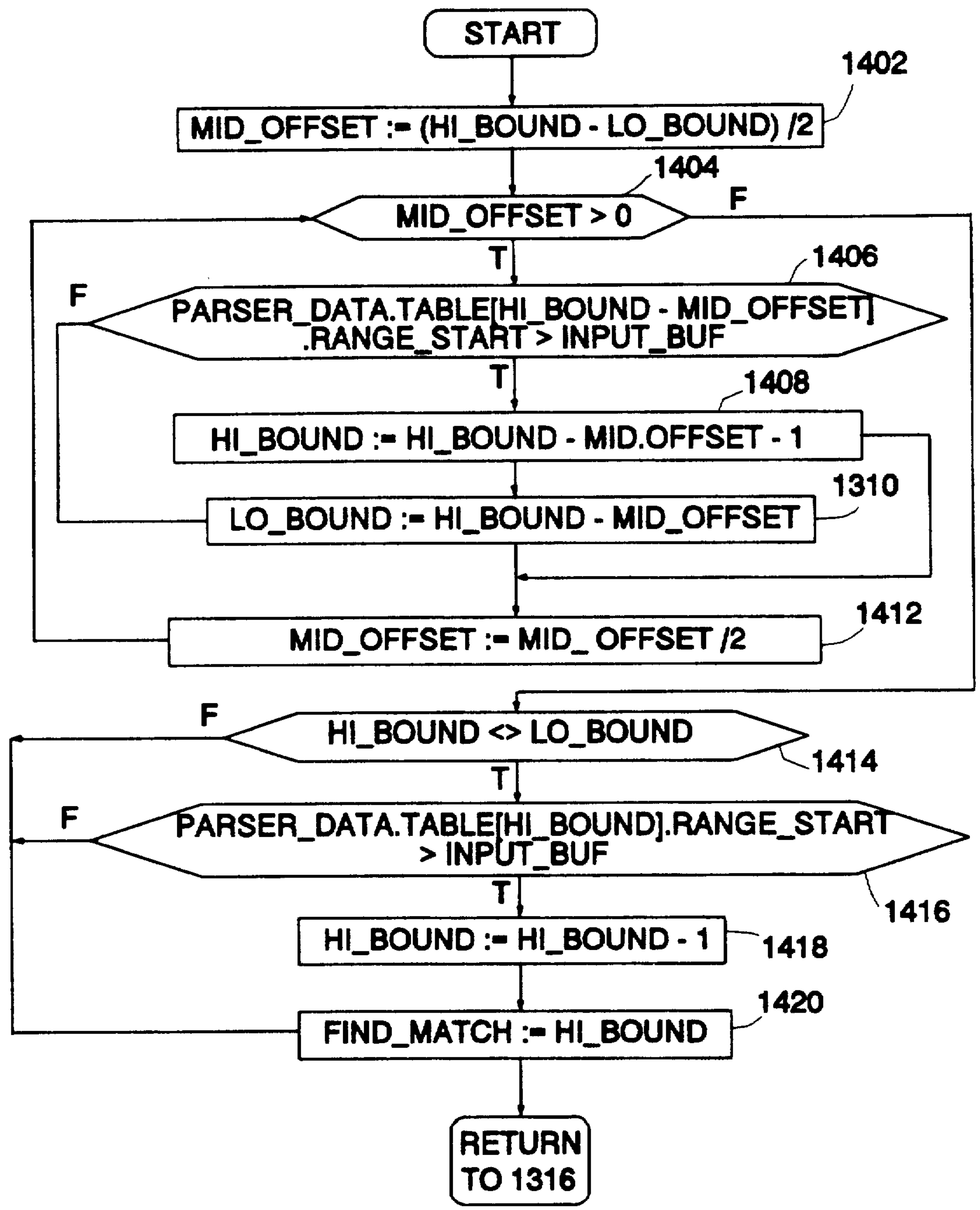

If no low or high bound match is found, there is potentially some overlap, so process step 1316 performs a binary search of that segment to determine where the overlap occurs. FIG. 14 illustrates this binary search process in more detail. Since the low and high bounds of the segment have been determined, the binary search repeatedly divides the range in half, eliminates one half and then searches within the remaining half. Hence, process step 1402 finds the midpoint of the range. The search terminates when the length of the section being searched is 0. This is determined by decision step 1404. If the condition is greater than 0, process step 1408 determines which side of the midpoint should be searched. If the range start at that midpoint is greater than the input buffer then the segment to be searched is the low half. Accordingly, process step 1408 reduces the high bound to be below the midpoint. Conversely, if the range start is lower than the midpoint, the high half of the range needs to be searched so process step 1410 sets the low bound equal to the high bound less the offset.

"Low bound" and "high bound" are indices in a table and the offset is the distance between them, specifically half the distance between them. Process step 1412 halves the range again. At the point where the offset is 0, the range has been reduced to a single entry. Decision step 1414 then checks whether or not the high bond is equal to the low bound. If it is, process step 1320 registers the match and return to process step 1418 of FIG. 13, which returns the result to step 918 or 920 of FIG. 9, as appropriate.

If process step 1414 indicates that high and low bounds are different, the nature of the difference is determined by process step 1416, which checks that the high bound start value is greater than the input buffer. If that condition is true then process step 1418 decrements the high bound. The resulting high bound is determined as the match by process step 1420 which then exits with a value an index of the range in the segment which contains the input string.

Figure 15:
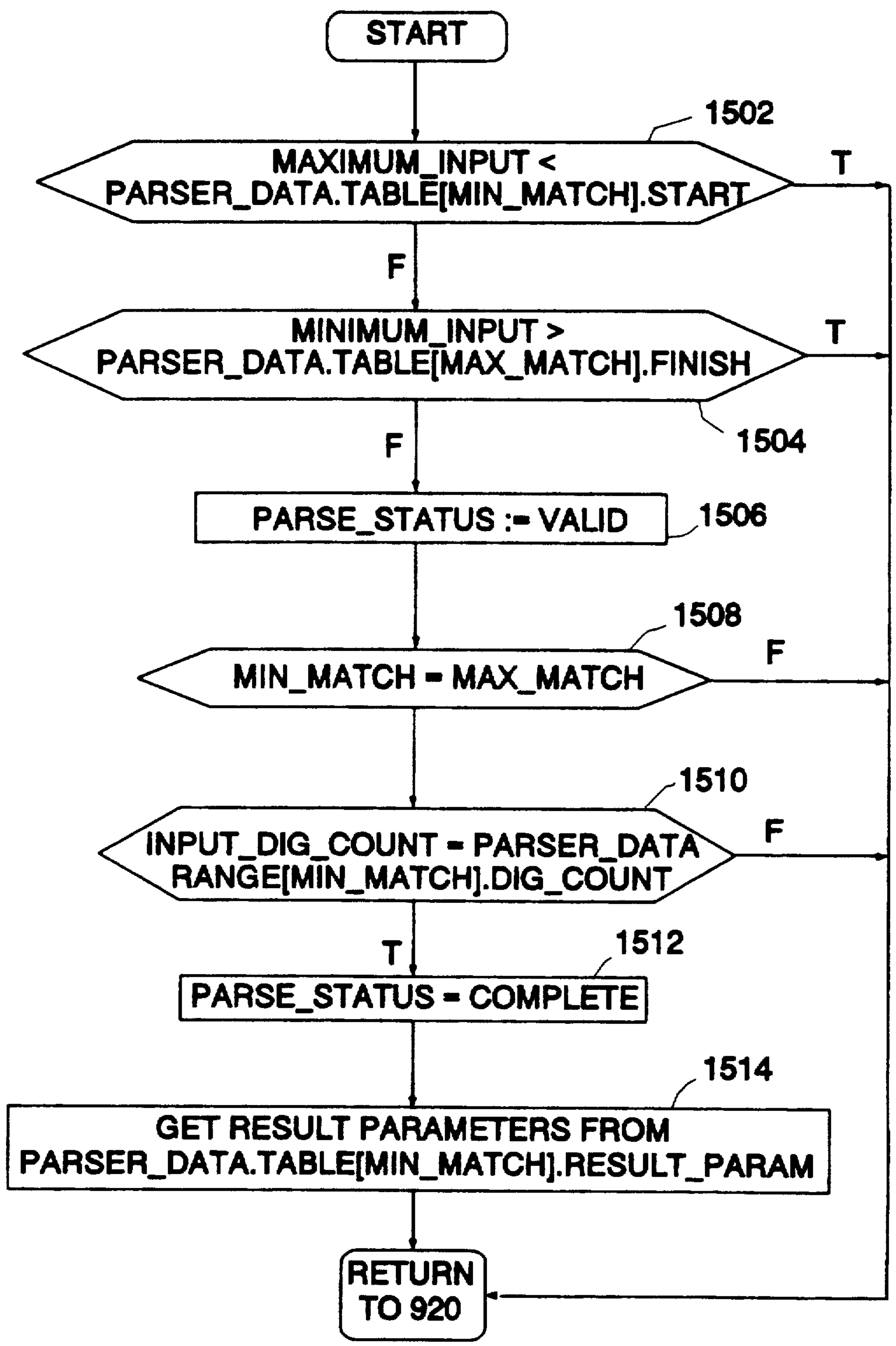

Process step 920, shown in more detail in FIG. 15, is applied to the results of both process step 916 and process step 918. The matches that were obtained in steps 916 and 918 are checked to see if they actually overlap with the database. Decision step 1502 checks whether the maximum input variable is less than the start value of the minimum match. If that is the case, there is no overlap so the "true" result leads the program to exit. If the result is false, and there is potential overlap, the high end of the range is checked in decision step 1504 to determine whether the minimum input variable is greater than the high end. If so, again there is no overlap and the program exits. If not, process step 1506 registers a valid result. Having established that the input potential range falls within the database range, process step 1508 checks whether or not the minimum and maximum matches are identical, in other words the index of the range is the same. That would indicate that the input range falls into a single range in the database, in which case decision step 1510 determines whether the number of digits in the input matches the number of digits in the database range. If it does, the result is complete, and there is an exact match between the input sequence and the sequence in the database. At this point, process step 1512 registers that the parsing is complete by assigning variable "parse status."

Process step 1514 looks up any result parameters which were associated with that range. These result parameters are defined at database setup. Various things may be done to the input digits before "return result". For example, the string may be returned with a simple "validated" statement. Alternatively, it might be preferred to substitute some other string. For example, for pass word validation, it might be sufficient to substitute a flag indicating that the password was valid without actually returning the string. Other possibilities include translating a digit string into a name and returning that to the user.

In summary, an invalid string causes the program to exit from step 1502, 1504, or 1510. For a valid but incomplete string, the program exits from step 1508. Finally, if the string is both valid and complete the program exits from step 1514. In all cases the program returns to step 920 in FIG. 9 and the whole sequence is repeated for any other segments (i.e. within different contexts as defined prior to the validation sequence).

The invention is not limited to user interfaces, i.e. where the character string is generated directly by a user, for example via a keyboard or other input device. It is envisaged that the embodiments of the invention could find application anywhere within the system wherever a sequence of characters needs to be validated. A particular example is central processing unit validation of character strings stores in a disc file.

One could view the interface 112 as merely an I/O interface for a much larger computer or telecommunications system i.e. as part of a user interface for such a system.

It should be noted that alternative methods of representing valid sequences in the database segments may be used, for example explicit match table, tree structures, and so on. The implementation software detailed in FIGS. 11 to 15 inclusive, and the Pascal declarations that define the database, would be modified as appropriate.

I claim:

1. A method of validating a character sequence input to a data processing apparatus, said character sequence comprising characters occurring in an alphabet comprising an ordered list of such characters, said apparatus comprising a database representing valid sequences of said characters, said database comprising one or more pairs each of a first valid sequence and a final valid sequence representing, respectively, limits of a continuous range of alphabetically ordered valid sequences all having the same number of characters up to a predetermined maximum number of characters, the ranges being mutually disjoint, said method comprising the steps of:

in the event that said character sequence has fewer than said maximum number of characters, appending to a copy of said character sequence one or more of the first character of said alphabet to form a first potential character sequence having said predetermined maximum number of characters and appending to another copy of said character sequence one or more of the last character of said alphabet to form a final potential character sequence having said predetermined maximum number of characters, said first potential character sequence and said final potential character sequence representing respective limits of a continuous potential range of potential input character sequences defined by possible values of possible succeeding characters;

comparing said first potential character sequence and said final potential character sequence with said pairs and determining validation of said character sequence independence upon whether or not there is intersection between said continuous potential range of potential input character sequences and a said range of valid sequences; and in the event that said character sequence has said maximum number of characters, comparing said character sequence with respective first and final valid sequences of said pairs and determining validation of said character sequence in dependence upon whether or not said character sequence lies in a said range.

2. A method as claimed in claim 1, wherein inputting of each individual said character forms a new said character sequence and the steps of deriving said first potential character sequence and said final potential character sequence, and comparing said first potential character sequence and said final potential character sequence with said pairs are performed on each said new character sequence.

3. A method as claimed in claim 1, wherein the steps of deriving said first potential character sequence and said final potential character sequence, and comparing said first potential character sequence and said final potential character sequence with said pairs of a first valid sequence and a final valid sequence, are performed only after a plurality of characters of said character sequence have been input, said first character of said alphabet and said last character of said alphabet being appended to said plurality of characters.

4. A method as claimed in claim 1, 2 or 3, wherein said database further comprises a data field specific to a particular range and the method further comprises the step of outputting contents of said data field in the event that said validation is determined with respect to said particular range.

5. A method as claimed in claim 1, 2 or 3, wherein said database comprises fields defining a set of one or more mutually disjoint database segments, each of said database segments comprising one or more of said ranges, no character sequence occurring in one segment of said set occurring in another segment of said set, said one or more segments comprising valid sequences having a common predetermined characteristic other than their alphabetical ordering, valid sequences in different ones of said ranges having the same number of characters, said database further comprising, for each of said ranges, a field giving the number of characters in each valid sequence in that range, and wherein said method further comprises the step of comparing the number of characters in the input character sequence with the number given in said field of the range in which said comparing is effected, and determining the input character sequence to be incomplete if the number of characters in said input character sequence is less than the number in said field, said comparing of said first potential character sequence and said final potential character sequence with said pairs of a first valid sequence and a final valid sequence being limited to said one or more segments.

6. A method as claimed in claim 1, 2 or 3, wherein said database comprises fields defining a set of one or more mutually disjoint database segments, each of said database segments comprising one or more of said ranges, no character sequence occurring in one segment of said set occurring in another segment of said set, said one or more segments comprising valid sequences having a common predetermined characteristics other than their alphabetical ordering, valid sequences in different ones of said ranges having the same number of characters, said database further comprising, for each of said ranges, a field giving the number of characters in each valid sequence in that range, said database further comprising a data field specific to a particular range, and wherein said method further comprises the step of comparing the number of characters in the input character sequence with the number given in said field of the range in which said comparing is effected, and determining the input character sequence to be incomplete if the number of characters in said input character sequence is less than the number in said field, said comparing of said first potential character sequence and said final potential character sequence with said pairs is limited to said one or more segments, and wherein said method further comprises the step of outputting contents of said data field in the event that said validation is determined between the input character sequence and a said valid sequence in said particular range.

7. A method as claimed in claim 1, 2 or 3, wherein said database comprises fields defining a set of one or more mutually disjoint database segments, each of said database segments comprising one or more of said ranges, no character sequence occurring in one segment of said set occurring in another segment of said set, said one or more database segments comprising valid sequences having a common predetermined characteristic other than their alphabetical ordering, and said comparing of said first potential character sequence and said final potential character sequence with said pairs of a first valid sequence and a final valid sequence is limited to said one or more database segments.

8. A method as claimed in claim 7, wherein said predetermined characteristic of valid sequences in said one or more segments in said set are preselected by the user.

9. A method as claimed in claim 1, 2 or 3, further comprising the step or comparing the number of characters in the input character sequence with said number of characters of valid sequences in the range in which said comparing with said pairs is effected, and determining the input character sequence to be incomplete if the number of characters in said input character sequence is less than said number of characters of said valid sequences.

10. A method as claimed in claim 9, wherein said database further comprises a data field specific to a particular range and the method further comprises the step of outputting contents of said data field in the event that said validation is determined with respect to said particular range.

11. A method as claimed in claim 1, 2 or 3, wherein said database further comprises, for each said range, a field giving the number of characters in each sequence in said range, and wherein said method further comprises the step of comparing the number of characters in the input character sequence with the number given in said field of the range in which said comparing with said pairs is effected, and determining the input character sequence to be incomplete if the number of characters in said input character sequence is less than the number in said field.

12. A method as claimed in claim 11, wherein different ones of said fields give different numbers, indicating that the number of characters in said valid sequences in one of said ranges differs from the number of characters in valid sequences in another of said ranges.

13. A method as claimed in claim 12, wherein said database further comprises a data field specific to a particular range and the method further comprises the step of outputting contents of said data field in the event that said validation is determined with respect to said particular range.

14. Data processing apparatus comprising means for validating a character sequence input thereto said character sequence comprising characters occurring in an alphabet comprising an ordered list of such characters, said apparatus comprising a database representing valid sequences of said characters, said database comprising one or more pairs each of a first valid sequence and a final valid sequence representing, respectively, limits of a continuous range of alphabetically ordered valid sequences all having the same number of characters up to a predetermined maximum number of characters, said ranges being mutually disjoint, said apparatus including;

means operable in dependence upon the number of characters in said character sequence being less than said predetermined maximum to append to a copy of said character sequence one or more of the first character of said alphabet to form a first potential character sequence having said predetermined maximum number of characters and to append to another copy of said character sequence one or more of the last character of said alphabet to form a final potential character sequence having said predetermined maximum number of characters, said first potential character sequence and said final potential character sequence representing respective limits of a continuous potential range of potential character sequences defined by possible values of possible succeeding characters;

means for comparing said first potential character sequence and said final potential character sequence with said pairs and determining validation of said input character sequence in dependence upon whether or not there is intersection between said potential range of potential character sequences and a said range of valid sequences; and means for operable in dependence upon said character sequence having said maximum number of characters to compare said character sequence with respective first and final valid sequences of said pairs and determine validation of said character sequence in dependence upon whether or not said character sequence lies in a said range.

15. Apparatus as claimed in claim 14, wherein inputting of each individual said character forms a new said character sequence, said means for appending first and last characters of said alphabet is operable to derive a said first potential character sequence and a said final potential character sequence for each new character sequence so formed, and said means for comparing is operable to compare said first potential character sequence and said final potential character sequence with said pairs for each said new character sequence.

16. Apparatus as claimed in claim 14, wherein said means for appending is operable to derive said first potential character sequence and said final potential character sequence only after a said character sequence having a plurality of characters has been input, said means for appending being operable to append said first character of said alphabet and said last character of said alphabet, respectively, to said plurality of characters.

17. Apparatus as claimed in claim 14, 15 or 16, wherein said database further comprises a data field specific to a particular range and said apparatus further comprises means for outputting contents of said data field in the event that said validation is determined with respect to said particular range.

18. Apparatus as claimed in claim 14, 15 or 16, wherein said database comprises fields defining a set of one or more mutually disjoint database segments, each of said database segments comprising one or more of said ranges, no valid sequence occurring in one segment of said set occurring in another segment of said set, said one or more database segments comprising valid sequences having a common predetermined characteristic other than their alphabetical ordering, and said means for comparing of said first potential character sequence and said final potential character sequence with said pairs is limited to comparing within said one or more segments.

19. Apparatus as claimed in claim 14, 15 or 16, wherein said database comprises fields defining a set of one or more mutually disjoint database segments, each of said database segments comprising one or more of said ranges, no character sequence occurring in one segment of said set occurring in another segment of said set, said one or more database segments comprising valid sequences having a common predetermined characteristic other than their alphabetical ordering, valid sequences in different ones of said ranges having the same number of characters, said database further comprising, for each of said ranges, a field giving the number of characters in each valid sequence in that range, and wherein said apparatus further comprises means for comparing the number of characters in the input character sequence with the number given in said field of the range in which said comparing with said pairs is effected, and for determining the input character sequence to be incomplete if the number of characters in said input character sequence is less than the number in said field, and wherein said means for comparing of said first potential character sequence and said final potential character sequence with said pairs is limited to comparing within said one or more segments.

20. Apparatus as claimed in claim 14, 15 or 16, wherein said database comprises fields defining a set of one or more mutually disjoint database segments, each of said database segments comprising one or more of said ranges, no character sequence occurring in one segment of said set occurring in another segment of said set, said one or more database segments comprising valid sequences having a common predetermined characteristics other than their alphabetical ordering, valid sequences in different ones of said ranges having the same number of characters, said database further comprising, for each of said ranges, a field giving the number of characters in each valid sequence in that range, said database further comprising a data field specific to a particular range, and wherein said apparatus further comprises means for comparing the number of characters in the input character sequence with the number given in said field of the range in which said comparing with said pairs is effected, and for determining the input character sequence to be incomplete if the number of characters in said input character sequence is less than the number in said field, said means for comparing of said first potential character sequence and said final potential character sequence with said pairs is limited to comparing within said one or more database segments, and wherein said apparatus further comprises means for outputting contents of said data field in the event that said validation is determined with respect to said particular range.

21. Apparatus as claimed in claim 14, 15 or 16, wherein said database further comprises, for each said range, a field giving the number of characters in each sequence in that range, and wherein said apparatus further comprises means for comparing the number of characters in the input character sequence with the number given in said field of the range in which comparison with said pairs is effected, and determining said input character sequence to be incomplete if the number of characters in said input character sequence is less than said number in said field.

22. Apparatus as claimed in claim 21, wherein different ones of said fields give different numbers, indicating that the number of characters in said valid sequences in one of said ranges differs from the number of characters in valid sequences in another of said ranges.

23. Apparatus as claimed in claim 22, wherein said database further comprises a data field specific to a particular range and said apparatus further comprises means for outputting contents of said data field in the event that said validation is determined with respect to said particular range.

24. Apparatus as claimed in claim 14, 15 or 16, further comprising means for comparing the number of characters in the input character sequences with said number of characters of valid sequences in the range in which said comparing with said pairs is effected, and for determining the input character sequence to be incomplete if the number of characters in said input character sequence is less than said number of characters of said valid sequences.

25. Apparatus as claimed in claim 24, wherein said database further comprises data specific to a particular range and said apparatus further comprises means for outputting contents of said data field in the event that said validation is determined with respect to said particular range.

26. Apparatus as claimed in claim 25, further comprising user-operable means for preselecting said predetermined characteristics of valid sequences in said one or more segments in said set.

* * * * *